2,943,042
HIGH TEMPERATURE CONVERSION PROCESS
Edward David Stokes and Everett Heath Spencer, Baton Rouge, La., assignors to Esso Research and Engineering Company, a corporation of Delaware
Filed Apr. 24, 1957, Ser. No. 654,741
3 Claims. (Cl. 208—127)

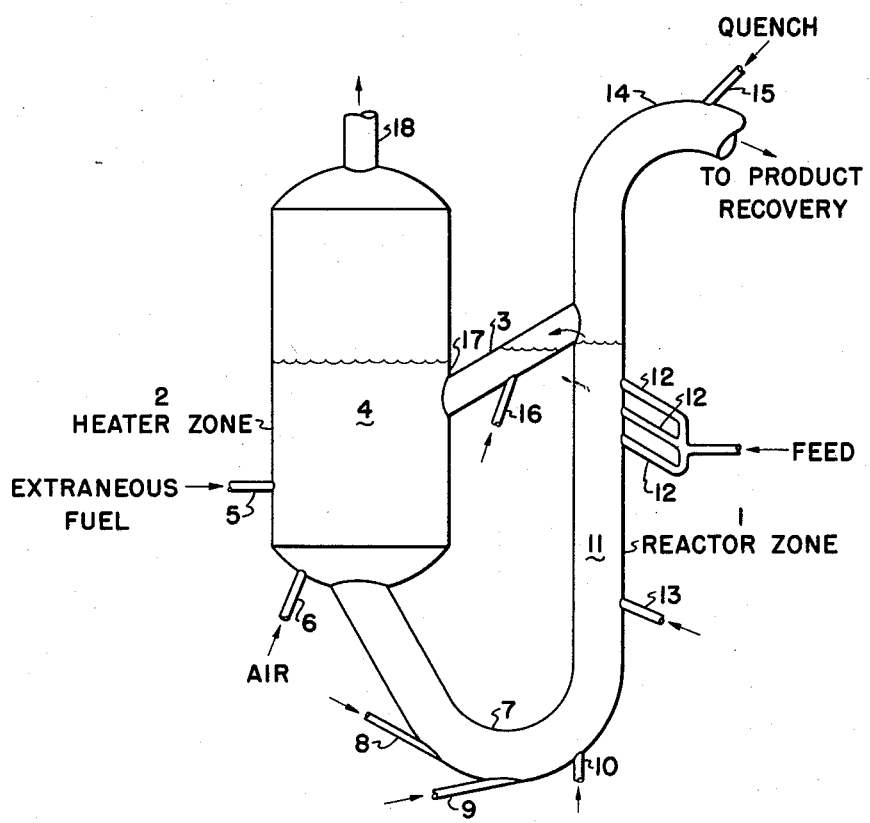
Fig. I
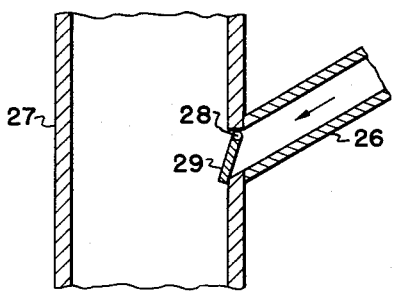
Fig. II
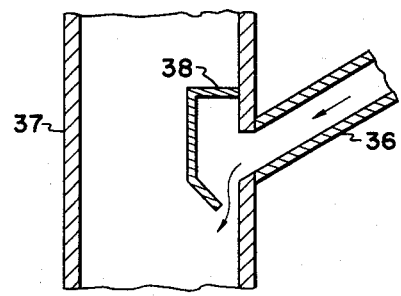
Fig. III
Edward D. Stokes
Everett H. Spencer   Inventors
By L. Chasan   Attorney _United States Patent Office_ 2,943,042
Patented June 28, 1960

The present invention relates to an improved hydrocarbon conversion system. More particularly, it deals with high temperature cracking of hydrocarbon oils within a single vessel by the application of circulating high density contact solids.

As is well known, the petroleum industry has fairly recently developed a process for cracking hydrocarbon feeds to lighter products by contacting heavy oils with a relatively turbulent bed of hot particulate solids, the process commonly referred to as fluid bed coking. When treating heavier petroleum feeds, inert solids such as coke, sand, glass beads and the like are conventionally employed as the contact particles. Heavy petroleum feeds amendable to such treatment are crudes, topped crudes, residua, atmospheric and vacuum bottoms, etc., typically having an initial boiling point of about 700° F. or higher, an A.P.I. gravity of about 0° to 20°, and a Conradson carbon residue content of about 5 to 40 wt. percent.

The oil, upon contact with the hot solids, is converted to vaporous reaction products and carbonaceous residue which is deposited upon the solids forming a carbon coating thereon. Generally, at least a portion of the particles coated in this manner are withdrawn from the reaction bed and circulated to a burner zone wherein oxidation of the carbonaceous deposits serve to heat the solids to requisite thermal cracking temperatures. Under some conditions of operation, it may be desirable to introduce an extraneous feed into the burner as additional supply of combustible material. The solid particles are then recirculated to the coking bed thereby supplying the thermal requirement of the conversion process.

Recently, there has been an increasing demand for converting heavy hydrocarbon oils to light unsaturated products such as ethylene and propylene. These low molecular weight unsaturates and aromatics are of relatively high value, finding use in the production of chemical and chemical intermediates. Towards the end of obtaining such valuable product distributions, the transfer line or dispersed phase coking process has been developed. The transfer line coking process comprises contacting a heavy oil with a rapidly flowing stream of solids maintained at a temperature above 1200° F. for reaction residence times of 0.01 to 5.0 seconds, preferably about 0.01 to 1.0 second. Solids suitable for this process are the same as those cited above for fluid bed reactions, range in size from about 0 to 400 microns and have a reaction zone density of 0.5 to 10 lb./ft.$^3$. The gaseous products of this high temperature, short residence time reaction are then separated from the contact solids by conventional means such as a cyclone-separator, solids being circulated to a burner vessel in much the same manner as in dense bed operations.

A more complete description of a transfer line process may be found in U.S. 2,731,508.

However, transfer line coking of hydrocarbons has presented several problems. Such the reaction zone solids are in the form of a well dispersed, high velocity stream, it has proven to be difficult to properly contact the oil feed with the flowing particles. Control of reaction times has been troublesome since slight interruptions or deviation from normal conditions in the coking or burner zones greatly affect solids circulation. Feed rates, and hence the yields of desired products, are particularly sensitive to such changes in the quantity of solids circulated.

Hence, there is considerable need for a high temperature reaction system wherein contact time is easily controlled and a sufficient supply of solids is always present in the reaction zone to receive the oil feed.

In accordance with the present invention, high temperature, short contact time hydrocarbon reaction is accomplished in a simplified conversion system under dense bed conditions. More particularly, high density solids are circulated between heating and reaction zones within a single vessel system, oil feed being injected at a suitable point in the dense phase reaction zone to provide the desired conversion residence time.

The various aspects of the present invention will be made more clearly apparent in the light of the following description, drawing and accompanying example.

Figure I depicts the simplified conversion system of the present invention, consisting primarily of reactor zone 1 and heater zone 2.

Figures II and III present modification of heater zone solid inlet conduit 3.

Turning to Figure 1, there is shown the conversion vessel of the present invention consisting primarily of reactor zone 1 and heater zone 2, said zones being connected by conduit 3 and U-shaped passageway 7. Reactor zone 1 has an inside diameter of 12 feet as compared to the 30 foot diameter of the heater section. As measured from the bottom of the U-shaped connecting conduit 7, the height of the solids beds normally supported in the reaction zone and heater zone are e.g. 40 and 36 feet respectively. In other words, the heater zone will, during usual operation, contain the major inventory of solids within the conversion system. Generally, this will be 80% of the overall solids inventory. Within heater zone 2 there is contained a turbulent bed 4 of dense, large sized inert solids. While mullite is employed in the present example, other high density materials such as iron, sand, and zirconium silicate spheres may be alternatively utilized. These contact solids range in size from 400 to 2000 microns, preferably averaging about 500 to 1000 microns, and have a true density varying from 150 to 500 lbs./ft.$^3$.

The solids, which are to be circulated to the heating zone, generally have a coating of carbonaceous material which they have acquired in the course of contacting oil feed in the reaction zone, as will be later further described.

Oxidizing gas, preferably air, is introduced into the heater zone by means of line 6 at an overall rate of 27 standard cubic feet/lb. of contact solids circulated between the two zones. The air, maintaining the heating zone solids in the form of dense fluidized mass of a density of 170 lbs./ft.$^3$, serves to oxidize the carbonaceous coating on the contact solids thereby heating them to high temperatures. In order to heat the solids to sufficiently high levels so that the solids, when circulated, may supply the requirement of the oil conversion process, it is generally necessary to introduce an extraneous fuel such as natural gas or torch oil, or bottoms of the cracking reaction, into the heater section by means of line 5. When utilizing a solids circulation rate of about 90 lbs./min./ft.$^2$ of reactor cross-section area, the heat supplied by the combustion of this extraneous fuel is approximately 2000 B.t.u./lbs. of solids circulated. The bed temperature is thus about 1600° F., or approximately 100 to 400° greater than the desired conversion temperature. Flue gas is removed overhead by line 18, and its heat content recovered if desired, by conventional means. The system is thereby maintained in thermal balance.

In accordance with the present invention, 90 lbs. of solids/min./ft.$^2$ of reactor cross-sectional area is withdrawn from the heater zone and passed to reactor section 1 by means of conduit 7. From its lowermost extremity to the bottom of the heating zone base, the conduit measures 18 feet. The density of the solids therein is 200 lbs./ft.$^3$. Steam is injected into conduit 7 at several points 8, 9 and 10 chosen to ensure smooth circulation of solids. Other propelling gases such as $N_2$, light hydrocarbons, or mixtures thereof may be alternatively utilized. The steam, introduced at an overall rate of 30 wt. percent based on feed, serves to convey the solids upwardly through the reaction zone as a dense, fluidized solids column 11 having a density of about 160 lbs./ft.$^3$ prior to feed injection.

In order to obtain the desired oil residence times of approximately 0.25 second prior to quench, hydrocarbon feed such as an Elk Basin residuum having properties tabulated below, is injected in the upper portion of reactor solids column by means on one, preferably several nozzles 12, at an overall rate of 0.06 lb./lb. of circulating solids.

TABLE I

Feed: Elk Basin crude

| | |
|---|---|
| Gravity, ° A.P.I. | 2.4 |
| Conradson carbon, wt. percent | 30.0 |
| $S_1$, wt. percent | 3.93 |
| $N_2$, wt. percent | 0.603 |
| H/C atomic ratio | 1.34 |
| Distillation: | |
| Initial boiling point, ° F. | 883 |
| 10% @ ° F. | 1041 |
| 20% @ ° F. | 1070 |

Upon contact with the hot, dense mullite particles, the oil feed is converted at a reaction temperature of 1380° F. to light gaseous hydrocarbons and carbonaceous material which deposits upon the contact solid, $C_3^-$ conversion being about 30 wt. percent. The vaporous reaction products rapidly pass upwards from reaction zone 1 and are withdrawn overhead through passageway 14. Since the contact solids are large sized, dense particles, it will normally not be necessary to employ cyclones or other conventional gas-solids separators in conjunction with the reaction systems. A solids separation efficiency of 99% is obtained when solids having a true density of 500 lbs./ft.$^3$ are used as the contact particles. Quench medium, such as water, feed stock, or recycle product oil boiling between 300 to 600° F., is injected by line 15 into the withdrawn vapors so as to prevent undue degradation of the desired reaction products. The quenched gases are then normally circulated to produce recovery treatment such as fractionation, scrubbing, crystallization, etc., as is well known in the art.

The upwardly moving reaction bed solids overflow into conduit 3, leading back into heating zone 4 at inlet 17. The solid particles are thus recirculated by gravity flow into the heating zone. It is generally desirable, though not mandatory, to pass steam by means of line 16 countercurrent to the movement of overflowing particles so as to remove any occluded hydrocarbons, and further to maintain a free moving solids flow.

It is preferred to operate the overall system with the upper level of reaction bed 11 significantly higher than that of heating bed 4. Thus, a solids seal in conduit 3 prevents heating zone gas from entering the conversion section of the system. However, other means, for example those set forth in Figures II and III, can be used in conjunction with the relative bed level requirement or entirely by themselves, for maintaining separation of heating and reaction zone vapors.

It may be desirable, under certain conditions of operation, to introduce the hydrocarbon oil feed at a lower portion of the reaction bed such as by means of nozzle 13. By controlling propelling gas injection, rate and point of feed injection, desired reaction time may be readily obtained.

The following table sets forth the product distribution resulting from operating in accordance with the above description.

TABLE II

Products, on feed

| | |
|---|---|
| $H_2$ wt. percent | .33 |
| $CH_4$ wt. percent | 4.50 |
| $C_2H_4$ wt. percent | 12.55 |
| $C_2H_6$ wt. percent | 2.40 |
| $C_3H_6$ wt. percent | 9.80 |
| $C_3H_8$ wt. percent | .42 |
| $C_4H_8$ wt. percent | 2.80 |
| $C_4H_{10}$ wt. percent | 6.50 |
| $C_5/430°$ vol. percent | 27.0 |
| 430°/650 vol. percent | 21.0 |
| 650/1050 vol. percent | 24.0 |
| 1050+ | 9.6 |
| Total carbon, wt. percent | 5.1 |

Turning to Figure II, there is shown the section of heater zone 27 in the immediate vicinity of overflow solids conduit 26. The drawing illustrates the application of a flapper valve 29 attached to wall inlet 28 for preventing heating zone vapors from mixing with the product of the conversion reaction.

Figure III presents an alternative mode of accomplishing this end. Structure 38 is designed to confine the entrance of conduit 36 into heater zone 37 so as to prevent backflow of combustion gases into the overflow line.

The following table presents a compilation of operating conditions relative to the above description.

TABLE III

| | Range |
|---|---|
| Contact solid: | |
| Maximum size, microns | 600 to 2000 |
| Minimum size, microns | 400 to 700 |
| Average size, microns | 500 to 1000 |
| True density, lbs./ft.$^3$ | 150 to 500 |
| Bulk density, lbs./ft.$^3$ | 110 to 350 |
| Fluidized density, lbs./ft.$^3$ | 80 to 170 |
| Apparatus: | |
| I.D. of reaction zone, ft. | 5 to 20 |
| I.D. of regenerator, ft. | 30 to 70 |
| Reactor bed level height, ft. | 3 to 60 |
| Regenerator bed level height, ft. | 10 to 60 |
| Height of U-seal outlet to heating zone, ft. | 10 to 30 |
| Process: | |
| Reaction bed temperature, ° F. | 1100 to 1600 |
| Regenerator bed temperature, ° F. | 1200 to 2000 |
| Regenerator bed density, lbs./ft.$^3$ | 80 to 170 |
| Density in standpipe from regenerator, lbs./ft.$^3$ | 100 to 200 |
| Density in reactor, before feed injection, lbs./ft.$^3$ | 80 to 170 |
| Density in reactor, after feed injection, lbs./ft.$^3$ | 70 to 150 |
| Superficial gas velocity in reactor, ft./sec. | 2 to 30 |
| Solids circulation rate, lbs./min./ft.$^2$ reactor | 50 to 300 |
| Feed rate, lbs./lb. solids circulated | .02 to .2 |
| Steam rate to reactor, wt. percent on feed | 5 to 50 |
| Efficiency of solids separation, percent | 90 to 100 |
| Oil residence time before quench, sec. | 0.1 to 1.0 |
| $C_3$-conversion, wt. percent | 20 to 60 |
| Air rate to burner, s.c.f./lb. solids circ. | 20 to 40 |
| Extraneous heat from oil injected into regen., B.t.u.'s/lb. solids circ. | 0 to 3000 |
| Burner hold-up, percent total solids inventory | 60 to 98 |
| Reactor hold-up, percent total solids inventory | 40 to 2 |
| Δ P over reaction zone, p.s.i. | 6 to 70 |

Numerous modifications may be applied to the above described system without departing from the spirit of the present invention. The present system finds application wherever controlled reaction residence times are desired in a simplified conversion system. Hence, a broad range of feed materials may be employed. Catalytic or semi-catalytic process conditions may be obtained by using the appropriate contact particles.

The present invention is not limited to the particular solids flow pattern described. Thus, it may be desirable to flow solids from the heater zone to the upper and/or middle of the reaction solids column. Similarly, the heating zone may be operated as a shot heater, gravity bed, or the like. While a cyclone is normally not required when high density solids are employed, a solids separator may be inserted in the system. In another modification, the area above the reaction zone bed may be enlarged to compensate for increased vapor velocity due to feed vaporization and thus further minimize solids entrainment.

By operating in accordance with the present invention, contact time is easily regulated by employing feed and aeration gas as split stream riser gases for controlling solids flow rate and oil residence time. Utilization of a dense phase of large, high density reaction particles eliminates the necessity for cyclone separation of solids and gas-product, and enables both reaction and regeneration to be carried out in a simplified conversion system design.

Having described the present invention, what is sought to be protected is concisely set forth in the following claims.

We claim:

1. A process for carrying out high temperature, short contact time reactions in the conversion of residual high boiling hydrocarbons having an initial boiling point of at least about 700° F. which comprises providing a mass of particulate carbonaceous containing solids in a heating zone, said solids having a size ranging from about 400 to about 2000 microns and having a true density of about 150 to 500 lbs. per cu. ft., introducing air into the bottom portion of said heating zone at a fluidizing velocity to maintain said carbonaceous containing solids as a dense fluidized bed while burning carbonaceous material from said solids and thereby heating the solids to a temperature in the range of 1200° F. to 2000° F., withdrawing heated solids from the bottom portion of said fluidized bed of solids in said heating zone and passing them through a confined U-shaped passageway as a dense fluidized mass, introducing aeration gas into the dense fluidized mass of solids in the lower portion of said U-shaped passageway to reduce the density of the fluidized mass of solids and to pass the less dense fluidized mass as a column of solids from said U-shaped passageway upwardly through a vertically arranged reaction zone as a solids column of much smaller diameter than said heating zone, the density of the fluidized solids in said reaction zone being in the range of about 80 to 170 lbs. per cu. ft., injecting preheated hydrocarbon oil into the upper portion only of said solids column moving upwardly through said reaction zone and maintained at a conversion temperature in the range between about 1100° F. and 1600° F., converting said residual oil to vaporous unsaturated hydrocarbons and carbonaceous residue which deposits on the solids by contacting said oil with said solids for a period between about 0.1 and 1.0 second, disengaging vaporous unsaturated hydrocarbons overhead from the upper end of said solids column in said reaction zone and recovering the disengaged vaporous unsaturated hydrocarbons, maintaining the top of said solids column in said reaction zone at a higher level than the top of the dense fluidized bed in said heating zone, overflowing solids from the top of said solids column of said reaction zone into a downwardly inclined confined passageway leading directly from said reaction zone to the interior of said heating zone below the level of solids therein to provide a solids seal to prevent gaseous material intermixing between said heating zone and said reaction zone while providing flow of carbonaceous containing solids from the upper end of said reaction zone to said heating zone for heating and recycling to said reaction zone and maintaining said solids in said downwardly inclined confined passageway in a flowable condition.

2. A process according to claim 1 wherein extraneous fuel is introduced into said heating zone to supply additional heat to said solids.

3. An apparatus for converting hydrocarbon oils which includes a heating vessel adapted to contain fluidized solids and having a top outlet for gas, means for introducing oxygen-containing gas into the lower portion of said heating vessel, a separate vertically arranged reaction vessel arranged adjacent said heating vessel and having a diameter less than one-half the diameter of said heating vessel and having substantially uniform diameter throughout its length, the bottom of said heating vessel and said reaction vessel being connected only by a U-shaped channel, a single conduit extending downwardly at an angle directly from top of said reaction vessel to an intermediate portion of said heating vessel for conducting solids from the top of said reaction vessel to said heating vessel whereby solids flow down from said heating vessel and upwardly in said reaction vessel for overflow into said single conduit and said heating vessel, means for introducing a fluidizing gas into the lower portion of said U-shaped channel to reduce the density of the fluidized solids therein and cause upward flow of a less dense fluidized column of solids through said reaction vessel, said reaction vessel having a top outlet at a higher level than the inlet to said conduit for removal of converted hydrocarbon products free of said solids and oil injection means positioned along only the upper portion of said reaction vessel for introducing hydrocarbon oil thereinto.

References Cited in the file of this patent

UNITED STATES PATENTS

| 2,464,812 | Johnson | Mar. 22, 1949 |
| 2,598,058 | Hunter | May 27, 1952 |